United States Patent
Tsoi et al.

(10) Patent No.: US 12,292,841 B2
(45) Date of Patent: May 6, 2025

(54) DATA PROCESSING METHOD AND APPARATUS OF AI CHIP AND COMPUTER DEVICE

(71) Applicant: Shenzhen Corerain Technologies Co., Ltd., Guangdong (CN)

(72) Inventors: Kuen Hung Tsoi, Guangdong (CN); Xinyu Niu, Guangdong (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 336 days.

(21) Appl. No.: 18/012,235

(22) PCT Filed: Jun. 22, 2021

(86) PCT No.: PCT/CN2021/101415
§ 371 (c)(1),
(2) Date: Dec. 22, 2022

(87) PCT Pub. No.: WO2021/259232
PCT Pub. Date: Dec. 30, 2021

(65) Prior Publication Data
US 2023/0251979 A1 Aug. 10, 2023

(30) Foreign Application Priority Data
Jun. 22, 2020 (CN) .......................... 202010575769.1

(51) Int. Cl.
*G06F 13/16* (2006.01)
*G06N 3/02* (2006.01)

(52) U.S. Cl.
CPC .............. *G06F 13/16* (2013.01); *G06N 3/02* (2013.01)

(58) Field of Classification Search
CPC .......... G06F 30/27; G06F 30/20; G06N 3/00; G06N 3/02; G06N 3/04; G06N 3/0464; G06N 3/06; G06N 3/082; G06N 5/00
See application file for complete search history.

(56) References Cited

U.S. PATENT DOCUMENTS

| | | | |
|---|---|---|---|
| 11,062,201 B2* | 7/2021 | Pan | G06F 15/78 |
| 11,741,350 B2* | 8/2023 | Huynh | G06N 3/0464 |
| | | | 706/41 |
| 2018/0300617 A1* | 10/2018 | McBride | G06F 1/3287 |
| 2021/0034958 A1* | 2/2021 | Sinha | G06N 3/08 |

FOREIGN PATENT DOCUMENTS

| | | |
|---|---|---|
| CN | 110046704 A | 7/2019 |
| CN | 110457256 A | 11/2019 |

OTHER PUBLICATIONS

International search report of PCT Patent Application No. PCT/CN2021/101415 issued on Sep. 24, 2021.

* cited by examiner

*Primary Examiner* — Idriss N Alrobaye
*Assistant Examiner* — Richard B Franklin

(57) ABSTRACT

The embodiments of the present application provide a data processing method and apparatus of an AI chip and a computer device. The data processing method of the AI chip includes: determining a target AI model for processing data to be processed; matching, in the AI chip, a data flow network corresponding to the target AI model and a data flow direction of the data flow network; and processing the data to be processed based on the data flow network and the data flow direction.

7 Claims, 4 Drawing Sheets

DATA PROCESSING METHOD AND APPARATUS OF AI CHIP AND COMPUTER DEVICE

The present application claims priority to Chinese Patent Application No. 202010575769.1, filed with the Chinese Patent Office on Jun. 22, 2020, which is incorporated herein by reference in its entirety.

TECHNICAL FIELD

The embodiments of the present application relate to the technical field of artificial intelligence (AI), in particular to a data processing method and apparatus of an AI chip and a computer device.

BACKGROUND

With the rapid development of artificial intelligence (AI), many AI chips for computing AI learning models have appeared in the market.

At present, the computation of AI learning models will generate a lot of computation workload, such as obtaining data through an instruction set and performing computation. In order to improve the computation efficiency of AI learning models, a common solution is to combine AI with data flows to reduce the performance overhead caused by obtaining data through the instruction set.

However, the current common solutions are all based on a data flow architecture customized by a specific AI learning model, which can only support a specific AI algorithm.

SUMMARY

The following is the summary of the subject matter detailed in the present application. The summary is not intended to limit the scope of the claims.

The embodiments of the present application provide a data processing method and apparatus of an AI chip and a computer device, so as to support multiple AI algorithms.

In the first aspect, the embodiments of the present application provide a data processing method of an AI chip, including:
  determining a target AI model for processing data to be processed;
  matching, in the AI chip, a data flow network corresponding to the target AI model and a data flow direction of the data flow network; and
  processing the data to be processed based on the data flow network and the data flow direction.

In the second aspect, the embodiments of the present application provide a data processing apparatus of an AI chip, including:
  an AI model determining module, configured to determine a target AI model for processing data to be processed;
  a data flow network matching module, configured to match, in the AI chip, a data flow network corresponding to the target AI model and a data flow direction of the data flow network; and
  a data processing module, configured to process the data to be processed based on the data flow network and the data flow direction.
  For example:
  In the third aspect, the embodiments of the present application provide a computer device, including:
  one or a plurality of processors; and
  a storage device, configured to store one or a plurality of computer programs, wherein
  when the one or the plurality of computer programs are executed by the one or the plurality of processors, the one or the plurality of processors implement the data processing method of the AI chip in any embodiment of the present application.

DETAILED DESCRIPTION

Figure 1:
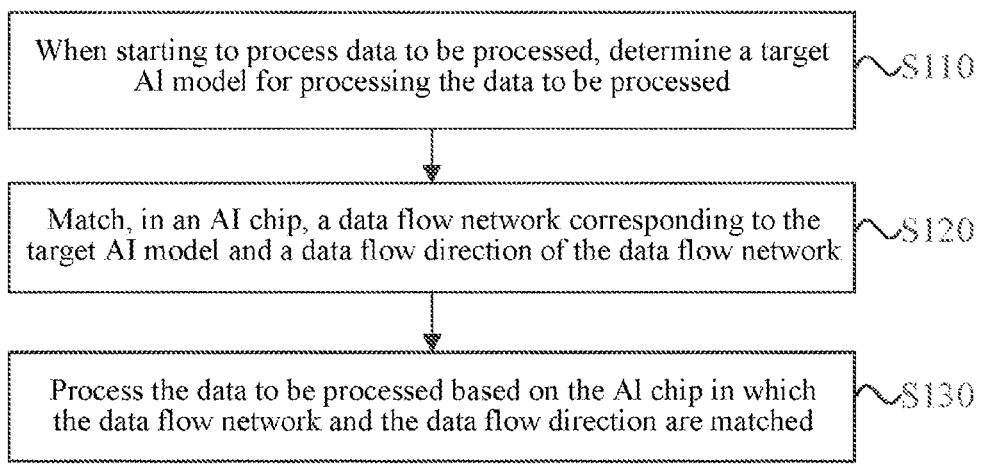
FIG. 1 is a schematic flow diagram of a data processing method of an AI chip provided by an embodiment of the present application.

The present application is further described in detail below with reference to accompanying drawings and embodiments. It may be understood that example of embodiments described herein are only used to explain the present application, but not to limit this present application. In addition, it should be further noted that, for ease of description, the accompanying drawings only show parts relevant to this application rather than the entire structure.

Before discussing the exemplary embodiments in more detail, it should be mentioned that some exemplary embodiments are described as processing or methods depicted as flow diagrams. Although in the flow diagrams, the steps are described as sequential processing, many steps may be implemented in parallel, concurrently or simultaneously. In addition, the sequence of each step may be rescheduled. The processing may be terminated when the operation is completed, but may further include additional steps not included in the drawings. The processing may correspond to methods, functions, procedures, sub-routines, sub-computer programs, and the like.

In addition, the terms "first", "second", and the like may be used herein for describing various directions, actions, steps or elements, but these directions, actions, steps or elements are not limited by these terms. These terms are only used for distinguishing the first direction, action, step or element from another direction, action, step or element.

For example, without departing from the scope of the present application, a first computation module may be called a second computation module, and similarly, a second computation module may be called a first computation module. The first computation module and the second computation module are both computation modules, but are not the same computation module. The terms "first" and "second" should not be construed as indicating or implying relative importance or implicitly indicating the number of technical features indicated. Therefore, features defining "first" and "second" may explicitly or implicitly include one or more such features. In the description of this application, "a plurality of" means at least two, such as two and three unless it is specifically defined otherwise.

FIG. 1 is a schematic flow diagram of a data processing method of an AI chip provided by an embodiment of the present application. The method can be applied to scenes in which the data is processed through an AI chip. The method can be executed by a data processing apparatus of an AI chip. The apparatus can be implemented by means of software and/or hardware, and can be integrated on a computer device.

As shown in FIG. 1, a data processing method of an AI chip provided by an embodiment of the present application includes:

S110: When starting to process data to be processed, a target AI model for processing the data to be processed is determined.

The data to be processed may be image data to be processed, voice data to be processed, text data to be processed, and the like, and is not specifically limited here. The target AI model refers to an AI learning model for processing the data to be processed. For example, the target AI model may be determined according to the type of a data model to be processed. For example, when the data to be processed is image data, the target AI model is a convolutional neural network (CNN) model; and when the data to be processed is text data, the target AI model is a recurrent neural network (RNN) model. In addition, the target AI model may also be determined according to the specific data to be processed. For example, when the data to be processed is text data and a time sequence is not considered, the target AI model is an RNN model. For example, the corresponding relationship between various data and AI models can be defined in advance according to needs, the feature information of the data to be processed is analyzed, and then, a target AI model corresponding to the data to be processed is determined by the feature information. For example, when an on-chip memory connected with an off-chip memory in the AI chip starts to receive the data to be processed, it can be considered as starting to process the data to be processed.

S120: A data flow network corresponding to the target AI model and a data flow direction of the data flow network are matched in the AI chip.

The data flow network refers to a combination of all modules, which is adapted to an algorithm corresponding to the target AI model and configured to realize the complete computation of the target AI model. The data flow direction of the data flow network refers to a flow direction of the data to be processed in the data flow network. For example, the data flow refers to an ordered sequence of points that can be read once or a few times. According to a pre-defined data flow direction, the data flow flows in the data flow network according to the data flow direction, so that the data can be read and then processed. In this embodiment, the AI chip includes, but is not limited to, a field-programmable gate array (FPGA) chip and a customized AI streaming accelerator (CAISA) chip.

In one implementation, the target AI model includes a first AI model and a second AI model, and a data flow network corresponding to the target AI model and a data flow direction are matched in the AI chip, including:

when the target AI model is the first AI model, a data flow network corresponding to the first AI model and a data flow direction are matched in the AI chip; and when the target AI model is the second AI model, a data flow network corresponding to the second AI model and a data flow direction are matched in the AI chip.

The first AI model and the second AI model are not specifically limited. For example, the first AI model and the second AI model may be CNN models, RNN models or other AI models, and are not specifically limited here. Taking the first AI model which is a CNN model and the second AI model which is an RNN model as an example, when the target AI model is a CNN model, a data flow network corresponding to the CNN model and a data flow direction are matched; and when the target AI model is an RNN model, a data flow network corresponding to the RNN model and a data flow direction are matched.

S130: The data to be processed is processed based on the AI chip in which the data flow network and the data flow direction are matched.

In this step, when the data flow network corresponding to the target AI model and the data flow direction of the data flow network are matched, the AI chip can process the data to be processed based on the data flow network and the data flow direction. For example, the data to be processed flows in the data flow network according to the data flow direction, the data flow network includes computation nodes for computing according to an algorithm of the target AI model, when the data reaches the computation nodes, the computation is performed, and the algorithm of the AI model is matched so as to process the data to be processed. For example, after the data to be processed is processed, the processed data result can be sent to a large-capacity off-chip memory for storage, or the processed data result can be used for the next computation.

In one implementation, a data flow network corresponding to the target AI model and a data flow direction of the data flow network are matched in the AI chip, including:

a target flow diagram corresponding to the target AI model is determined; a plurality of computation nodes in the target flow diagram and a computation sequence of the plurality of computation nodes are determined; a target computation module corresponding to each computation node is matched in the AI chip to obtain a plurality of target computation modules; a connection result of the plurality of target computation modules is taken as the data flow network; and the data flow direction is determined based on the computation sequence of the plurality of computation nodes.

The target flow diagram refers to a graphical method for representing a connection relationship between a computation module and a storage module in an AI chip, a logical flow direction of data in the AI chip and a procedure of processing the data by the computation module by means of graphics in terms of data transfer and data processing. The target flow diagram in this embodiment at least includes a plurality of computation nodes corresponding to the target AI model and a computation sequence of the plurality of computation nodes, and may further include storage nodes. The target flow diagram is used for representing a flow start point, a flow direction and a flow end point of data. The target computation module refers to a computation module configured to compute an operator of the corresponding computation node. The operator is a mapping O: X→X from a function space to a function space. A plurality of computation modules are pre-defined in the AI chip, the plurality of computation modules are mixed to form a data flow network to execute algorithms of different AI models, and a connection result of the plurality of target computation modules serves as the data flow network. For example, the data flow direction is determined based on the computation sequence of the plurality of computation nodes, which may include: a computation sequence of the plurality of target computation modules is determined based on the computation sequence of the plurality of computation nodes; and the computation sequence of the plurality of target computation modules is taken as the data flow direction.

For example, the AI chip further includes a storage module configured to store the data to be processed, the storage module includes a first storage module, at least two first sub-target computation modules, each first sub-target computation module includes at least one target computation module, and the first storage module is arranged between two adjacent first sub-target computation modules. When the computation of the previous first sub-target computation module is completed and the computation of the next first sub-target computation module is not completed, the first storage module stores a computation result of the previous first sub-target computation module; and when the computation of the next first sub-target computation module is completed, the first storage module transmits the computation result of the previous first sub-target computation module to the next first sub-target computation module. One or a plurality of target computation modules serve as first sub-target computation modules. By arranging the first storage module between two adjacent first sub-target computation modules, when the computation of the previous first sub-target computation module and the computation of the next second sub-target computation module are both completed, the first storage module transmits computation results to ensure that the computation in each target computation module can be carried out orderly.

Exemplarily, when the target AI model is a CNN model, the computation of the CNN model respectively includes a convolutional layer, a pooling layer and a fully connected layer, a plurality of target computation modules include a target computation module corresponding to the convolutional layer, a target computation module corresponding to the pooling layer and a target computation module corresponding to the fully connected layer, and the three target computation modules are connected according to a data flow direction to obtain a data flow network. Since the computation of the CNN model is performed through the convolutional layer, the pooling layer and the fully connected layer in sequence, the data flow direction in the data flow network corresponding to the CNN model is: the data flows from the target computation module corresponding to the convolutional layer to the target computation module corresponding to the pooling layer, and then flows from the target computation module corresponding to the pooling layer to the target computation module corresponding to the fully connected layer.

In one implementation, at least two second sub-target computation modules receive the data to be processed through one second storage module. The data processing method of the AI chip further includes:

the same data required by at least two second sub-target computation modules in the data to be processed is copied in the second storage module to obtain at least two copies of the same data, and the at least two copies of the same data are respectively transmitted to the at least two second sub-target computation modules.

In this implementation, the same data may be the weight in the algorithm of the target AI model, which is not specifically limited here. The second sub-target computation modules refer to at least two target computation modules connected with one second storage module. In this implementation, the same data is copied in one second storage module and then is transmitted to two second sub-target computation modules, thereby reducing the number of second storage modules to reduce the hardware cost.

Figure 2:
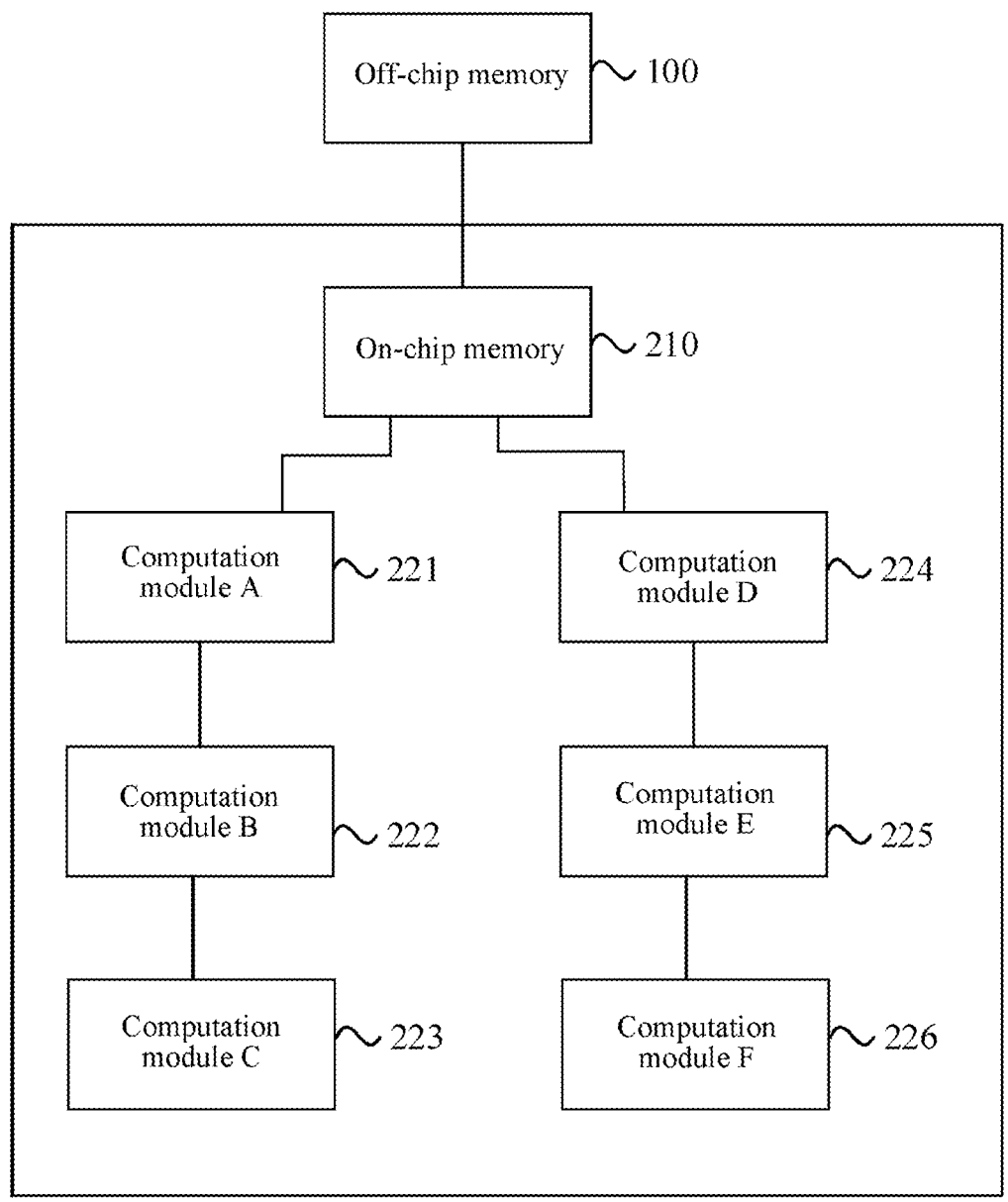
FIG. 2 is a schematic structural diagram of an AI chip provided by an embodiment of the present application.

Referring to FIG. 2, FIG. 2 is a schematic structural diagram of an AI chip provided by this embodiment. It can be seen from FIG. 2 that an AI chip 200 includes an on-chip memory 210 connected with an off-chip memory 100, a computation module A 221, a computation module B 222, a computation module C 223, a computation module D 224, a computation module E 225, and a computation module F 226, wherein the computation module A 221, the computation module B 222 and the computation module C 223 are connected in sequence, the computation module A 221 is set for computation of a convolutional layer, the computation module B 222 is set for computation of a pooling layer, and the computation module C 223 is set for computation of a fully connected layer; and the computation module D 224, the computation module E 225 and the computation module F 226 are connected in sequence, and the computation module D 224, the computation module E 225 and the computation module F 226 are all set for computation according to operation nodes of an RNN algorithm. When the data to be processed is image data, a CNN model is required for computation, that is, a target AI model is the CNN model, a data flow network is a connection result of the computation module A 221, the computation module B 222 and the computation module C 223, and the data flow direction is the computation module A 221, the computation module B 222 and the computation module C 223 in sequence; and when the data to be processed is text data, a data flow network is a connection result of the computation module D 224, the computation module E 225 and the computation module F 226, and the data flow direction is the computation module D 224, the computation module E 225 and the computation module F 226 in sequence. In addition, a CNN model and an RNN model can be operated simultaneously.

It can be understood that computation modules adapted to algorithms of various AI models can be arranged in the AI chip according to needs, so as to support algorithms of different AI models in one AI chip.

According to the technical solutions of the embodiments of the present application, when starting to process data to be processed, a target AI model for processing the data to be processed is determined; a data flow network corresponding to the target AI model and a data flow direction of the data flow network are matched in the AI chip; and the data to be processed is processed based on the AI chip in which the data flow network and the data flow direction are matched. Different AI models can be operated on one chip through the solution of the method embodiment, and multiple AI algorithms can be supported to process data on one chip. The present application avoids the situation that the current common solutions are all based on a data flow architecture customized by a specific AI learning model, which can only support a specific AI algorithm, and the present application can support multiple AI algorithms.

Figure 3:
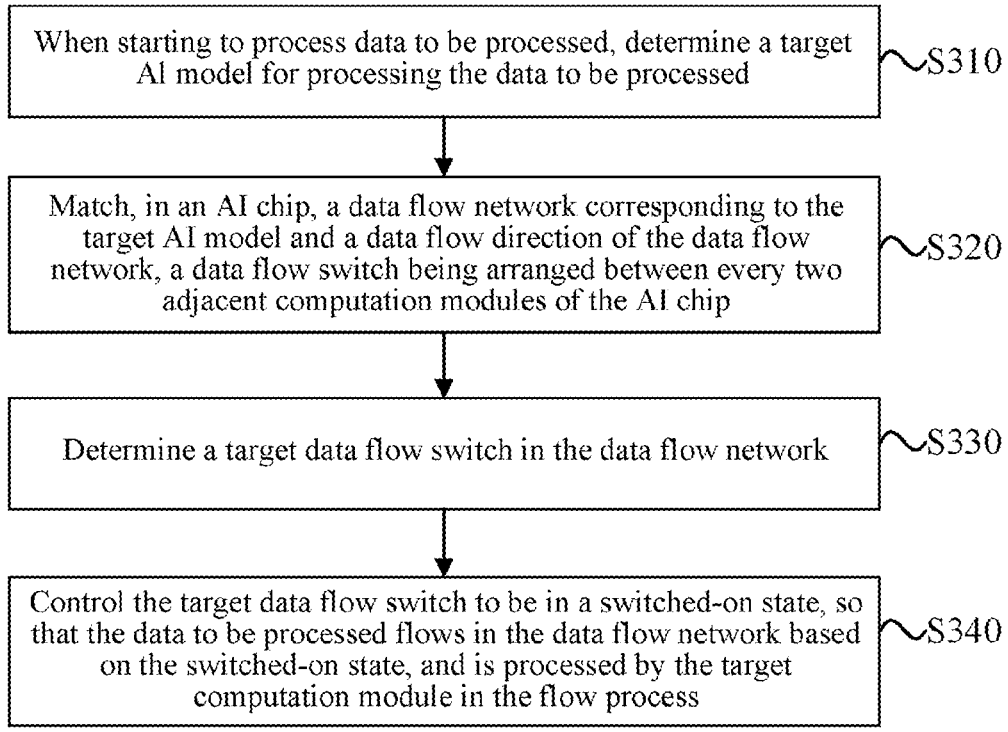
FIG. 3 is a schematic flow diagram of another data processing method of an AI chip provided by an embodiment of the present application.

FIG. 3 is a schematic flow diagram of another data processing method of an AI chip provided by an embodiment of the present application. On the basis of the above technical solution, the present embodiment refines the processing of the data to be processed based on the AI chip in which the data flow network and the data flow direction are matched. The method can be executed by a data processing apparatus of an AI chip. The apparatus can be implemented by means of software and/or hardware, and can be integrated on a computer device.

As shown in FIG. 3, a data processing method of an AI chip provided by an embodiment of the present application includes:

S310: When starting to process data to be processed, a target AI model for processing the data to be processed is determined.

S320: A data flow network corresponding to the target AI model and a data flow direction of the data flow network are matched in the AI chip, and a data flow switch is arranged between every two adjacent computation modules of the AI chip.

The AI chip includes a plurality of data flow switches and a plurality of computation modules.

The data flow switch is a unit for controlling data to be transmitted between two adjacent computation modules.

S330: A target data flow switch in the data flow network is determined.

The target data flow switch refers to a data flow switch in the data flow network. For example, a target data flow switch corresponding to a target AI model is matched according to an algorithm of the target AI model, and the data flow switch between every two adjacent target computation modules is the target data flow switch in this embodiment.

S340: The target data flow switch is controlled to be in a switched-on state, so that the data to be processed flows in the data flow network according to the data flow direction, and is processed by the target computation module in the flow process.

When the data flow switch is in a switched-on state, the data can be transmitted through the data flow switch to flow to the next module. When the data to be processed is obtained by the target computation module in the flow process of the data flow network, the target computation module will compute each parameter carried by the data to be processed.

In this embodiment, since only the target data flow switch is controlled to be in a switched-on state and other data flow switches are controlled to be in a switched-off state, the data to be processed flows in the data flow network according to the data flow direction in the form of streams and then is processed by the target computation module, so as to obtain a processing result.

According to the technical solutions of the embodiments of the present application, when starting to process data to be processed, a target AI model for processing the data to be processed is determined; a data flow network corresponding to the target AI model and a data flow direction of the data flow network are matched in the AI chip; and the data to be processed is processed based on the data flow network and the data flow direction. Different AI models can be operated on one chip through the solution of the method embodiment, and multiple AI algorithms can be supported to process data on one chip. In addition, by maintaining the target data flow switch between every two target computation modules in a switched-on state, the data can only flow in the data flow network corresponding to the target AI model according to the data flow direction, so as to ensure that the data to be processed can be processed normally.

Figure 4:
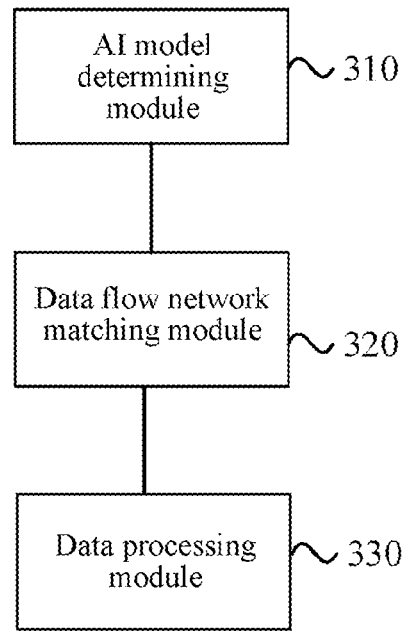
FIG. 4 is a schematic structural diagram of a data processing apparatus of an AI chip provided by an embodiment of the present application.

FIG. 4 is a schematic structural diagram of a data processing apparatus of an AI chip provided by an embodiment of the present application. This embodiment can be applied to scenes in which the data is processed through an AI chip. The apparatus can be implemented by means of software and/or hardware, and can be integrated on a computer device.

As shown in FIG. 4, a data processing apparatus of an AI chip provided by this embodiment may include an AI model determining module 310, a data flow network matching module 320 and a data processing module 330, wherein the AI model determining module 310 is configured to determine a target AI model for processing the data to be processed when starting to process data to be processed; the data flow network matching module 320 is configured to match, in the AI chip, a data flow network corresponding to the target AI model and a data flow direction of the data flow network; and the data processing module 330 is configured to process the data to be processed based on the AI chip in which the data flow network and the data flow direction are matched.

For example, the data flow network matching module 320 includes: a flow diagram determining unit, configured to determine a target flow diagram corresponding to the target AI model; a computation node determining unit, configured to determine a plurality of computation nodes in the target flow diagram and a computation sequence of the plurality of computation nodes; a computation module matching unit, configured to match, in the AI chip, a target computation module corresponding to each computation node to obtain a plurality of target computation modules; a data flow network determining unit, configured to take a connection result of the plurality of target computation modules as the data flow network; and a data flow direction determining unit, configured to determine the data flow direction based on the computation sequence of the plurality of computation nodes.

For example, the data flow direction determining unit is configured to determine a computation sequence of the plurality of target computation modules based on the computation sequence of the plurality of computation nodes; and take the computation sequence of the plurality of target computation modules as the data flow direction.

For example, the AI chip further includes a storage module configured to store the data to be processed, the storage module includes a first storage module, at least two first sub-target computation modules, each first sub-target computation module includes at least one target computation module, and the first storage module is arranged between two adjacent first sub-target computation modules. The first storage module is configured to store a computation result of the previous first sub-target computation module when the computation of the previous first sub-target computation module is completed and the computation of the next first sub-target computation module is not completed, and transmit the computation result of the previous first sub-target computation module to the next first sub-target computation module when the computation of the next first sub-target computation module is completed.

For example, the AI chip includes a plurality of data flow switches and a plurality of computation modules, and a data flow switch is arranged between every two adjacent computation modules of the AI chip. The data processing module 330 includes: a data flow switch determining unit, configured to determine a target data flow switch in the data flow network; and a data processing unit, configured to control the target data flow switch to be in a switched-on state, so that the data to be processed flows in the data flow network according to the data flow direction, and is processed by the target computation module in the flow process.

For example, at least two second sub-target computation modules receive the data to be processed through one second storage module. The apparatus further includes: a data copying module, configured to copy the same data required by at least two second sub-target computation modules in the data to be processed in the second storage module to obtain at least two copies of the same data, and respectively transmit the at least two copies of the same data to the at least two second sub-target computation modules.

For example, the target AI model includes a first AI model and a second AI model. The data flow network matching module 320 is configured to match, in the AI chip, a data flow network corresponding to the first AI model and a data flow direction when the target AI model is the first AI model, and match, in the AI chip, a data flow network corresponding to the second AI model and a data flow direction when the target AI model is the second AI model.

The data processing apparatus of the AI chip provided by the embodiments of the present application can execute the data processing method of the AI chip provided by any embodiment of the present application, and has the corresponding functional modules and beneficial effects of the execution method. The contents not described in detail in the embodiments of the present application can refer to the description in any method embodiment of the present application.

Figure 5:
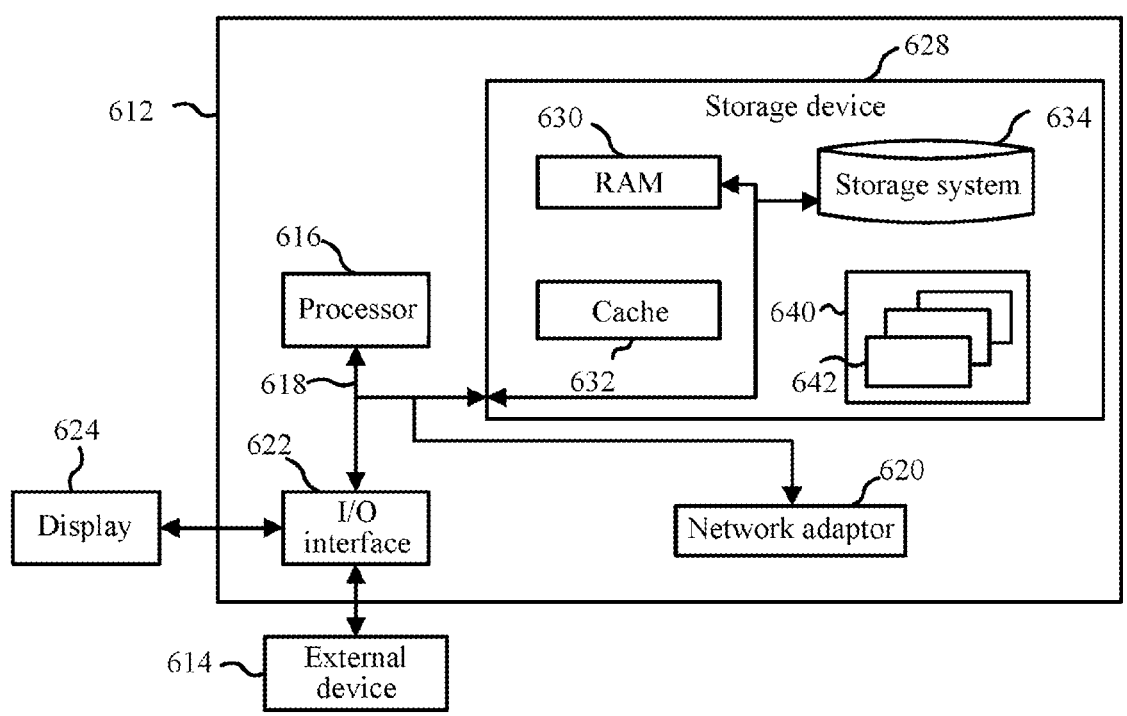
FIG. 5 is a schematic structural diagram of a computer device provided by an embodiment of the present application.

FIG. 5 is a schematic structural diagram of a computer device provided by an embodiment of the present application. FIG. 5 shows a block diagram of an exemplary computer device 612 adapted to implement the implementations of the present application. A computer device 612 shown in FIG. 5 is only an example, and does not impose any restriction on functions and scopes of use of the embodiments of this application.

As shown in FIG. 5, the computer device 612 is shown in the form of a general computer device. Components of the computer device 612 may include, but are not limited to, one or a plurality of processors 616, storage devices 628, and buses 618 connecting different system components (including the storage devices 628 and the processors 616).

The bus 618 indicates one or more of several types of bus structures, including a memory device bus or memory device controller, a peripheral bus, an accelerated graphics port, a processor, or a local bus using any of a plurality of bus architectures.

The computer device 612 typically includes a plurality of computer system readable media. Such media may be any usable media that can be accessed by the computer device 612, including volatile and non-volatile, removable and non-removable media.

The storage device 628 may include a computer system readable medium in the form of a volatile memory, such as a random access memory, RAM)) 630 and/or a cache memory 632. The computer device 612 may include another volatile and non-volatile, and removable and non-removable computer system storage medium. Merely used as an example, a storage system 634 may be configured to read from or write to a non-removable nonvolatile magnetic medium (not shown in FIG. 5, generally referred to as a "hard disk drive"). Although not shown in FIG. 5, there may provide a magnetic disk drive that is configured—to read from or write to a removable, nonvolatile magnetic disk such as a floppy disk (an optical disk drive that reads from or writes to a removable, nonvolatile read only memory (CD-ROM), a digital video disc read only memory (DVD-ROM) or another optical medium. In such cases, each drive may be connected to the bus 618 through one or more data medium interfaces. The storage device 628 may include at least one computer program product having a set (e.g., at least one) of computer program modules, configured to carry out the functions of embodiments of this application.

A computer program/utility 640, having a set (at least one) of computer program modules 642, may be stored in the storage device 628 by way of example. Such computer program modules 642 include, but are not limited to an operating system, one or more application computer programs, another computer program module, and computer program data. Each of such examples or some combination thereof may include an implementation of a networking environment. The computer program modules 642 generally implement the functions/methods described in the embodiments of the present application.

The computer device 612 may alternatively communicate with one or more external devices 614 (such as a keyboard, a pointing terminal, and a display 624), may alternatively communicate with one or more terminals that enable a user to interact with the computer device 612, and/or communicate with any terminal (such as a network card, a modem, etc.) that enables the computer device 612 to communicate with one or more other computing terminals. Such communication may be performed by using an input/output (I/O) interface 622. The computer device 612 may further communicate with one or more networks such as a local area network (LAN), a wide area network, WAN)), and/or a public network (such as Internet) through a network adapter 620. As shown in FIG. 5, the network adapter 620 communicates with other modules through the bus 618 and the computer device 612. It is to be understood that although not shown in the figure, other hardware and/or software modules may be used with combination of the computer device 612, including, but not limited to a microcode, a terminal driver, a redundant processing device, an external disk drive array, a RAID system, a tape drive, a data backup storage system, or the like.

The processor 616 executes various functional applications and data processing by running computer programs stored in the storage device 628, such as implementing a data processing method of an AI chip provided by any embodiment of the present application. The method may include:

when starting to process data to be processed, a target AI model for processing the data to be processed is determined;

a data flow network corresponding to the target AI model and a data flow direction of the data flow network are matched in the AI chip; and the data to be processed is processed based on the AI chip in which the data flow network and the data flow direction are matched.

According to the technical solutions of the embodiments of the present application, when starting to process data to be processed, a target AI model for processing the data to be processed is determined; a data flow network corresponding to the target AI model and a data flow direction of the data flow network are matched in the AI chip; and the data to be processed is processed based on the AI chip in which the data flow network and the data flow direction are matched. Different AI models can be operated on one chip through the solution of the method embodiment, and multiple AI algorithms can be supported to process data on one chip.

Note that the above is only an example embodiment of the application and the applied technical principle. Those skilled in the art will understand that this application is not limited to the specific embodiments described here, and that it is possible for those skilled in the art to make various obvious changes, readjustments and substitutions without departing from the scope of protection of this application. Therefore, although the application has been described in more detail through the above embodiments, the application is not limited to the above embodiments. Without departing from the concept of the application, it can also include more equivalent embodiments, and the scope of the application is determined by the scope of the appended claims.

What is claimed is:

1. A data processing method of an artificial intelligence (AI) chip, comprising:
configuring a plurality of data flow switches and a plurality of computation modules corresponding to a plurality of AI models in the AI chip, one of the plurality of data flow switches being arranged between every two adjacent computation modules of the AI chip;
determining a target AI model from the plurality of AI models for processing data to be processed;
matching, in the AI chip, a data flow network corresponding to the target AI model and a data flow direction of the data flow network, the matching comprising:
connecting corresponding ones of the plurality of computation modules corresponding to the target AI model to form the data flow network; and
determining a computation sequence of the corresponding ones of the plurality of computation modules to form the data flow direction; and
processing the data to be processed based on the data flow network and the data flow direction, the processing comprising:
determining a target data flow switch in the data flow network; and
controlling the target data flow switch to be in a switched-on state, so that the data to be processed flows in the data flow network according to the data flow direction, and is processed by the corresponding ones of the plurality of computation modules in the data flow network in a flow process.

2. The method according to claim 1, wherein the step of matching, in the AI chip, a data flow network corresponding to the target AI model and a data flow direction of the data flow network further comprises:
determining a target flow diagram corresponding to the target AI model;
determining a plurality of computation nodes in the target flow diagram and a computation sequence of the plurality of computation nodes; and
matching, in the AI chip, a target computation module corresponding to each computation node to obtain the corresponding ones of the plurality of computation modules.

3. The method according to claim 2, wherein the data flow direction is determined by:
determining the computation sequence of the corresponding ones of the plurality of computation modules based on the computation sequence of the plurality of computation nodes; and
taking the computation sequence of the corresponding ones of the plurality of computation modules as the data flow direction.

4. The method according to claim 2, wherein the AI chip further comprises a storage module configured to store the data to be processed, the storage module comprises a first storage module, the AI chip further comprises at least two first sub-target computation modules, each first sub-target computation module comprises at least one target computation module, and the first storage module is arranged between two adjacent first sub-target computation modules;
when computation of a previous first sub-target computation module is completed and computation of a next first sub-target computation module is not completed, the first storage module stores a computation result of the previous first sub-target computation module; and when the computation of the next first sub-target computation module is completed, the first storage module transmits the computation result of the previous first sub-target computation module to the next first sub-target computation module.

5. The method according to claim 2, wherein the AI chip further comprises a storage module configured to store the data to be processed, the storage module comprises a second storage module, the AI chip further comprises at least two second sub-target computation modules, each second sub-target computation module comprises at least two target computation modules connected with one second storage module, and the at least two second sub-target computation modules receive the data to be processed through one second storage module; and the method further comprises:
copying same data required by the at least two second sub-target computation modules in the data to be processed in the second storage module to obtain at least two copies of the same data, and respectively transmitting the at least two copies of the same data to the at least two second sub-target computation modules.

6. The method according to claim 1, wherein the target AI model comprises a first AI model and a second AI model, and the step of matching, in the AI chip, a data flow network corresponding to the target AI model and a data flow direction comprises:
in response to determining the target AI model as the first AI model, matching, in the AI chip, a data flow network corresponding to the first AI model and a corresponding data flow direction; and
in response to determining the target AI model as the second AI model, matching, in the AI chip, a data flow network corresponding to the second AI model and a corresponding data flow direction.

7. A computer device, comprising:
one or a plurality of processors; and
a storage device, configured to store one or a plurality of computer programs, wherein
when the one or the plurality of computer programs are executed by the one or the plurality of processors, the one or the plurality of processors implement the data processing method of the AI chip according to claim 1.

\* \* \* \* \*